United States Patent [19]
Petelle et al.

[11] Patent Number: 5,470,600
[45] Date of Patent: Nov. 28, 1995

[54] METHOD OF MAKING FAT FREE POTATO CHIPS

[75] Inventors: Joey Petelle; Karen D. Stoesz, both of Scottsdale; Lisa R. Williams, Chandler, all of Ariz.

[73] Assignee: Auburn Farms, Inc., Sacramento, Calif.

[21] Appl. No.: 168,640

[22] Filed: Dec. 16, 1993

[51] Int. Cl.⁶ .................. A23L 1/00; H05B 6/00
[52] U.S. Cl. .......... 426/237; 426/244; 426/637; 426/804
[58] Field of Search .................. 426/237, 244, 426/243, 637, 804, 808; 219/764

[56] References Cited

U.S. PATENT DOCUMENTS

| | | | |
|---|---|---|---|
| 2,286,644 | 6/1942 | Pringle | 99/100 |
| 2,508,382 | 5/1950 | Gard | 219/764 |
| 3,107,284 | 10/1963 | Dixon et al. | 219/764 |
| 3,353,962 | 11/1967 | Smith | 99/100 |
| 3,365,301 | 1/1968 | Lipoma | 99/100 |
| 3,493,400 | 2/1970 | Truckenbrodt | 99/204 |
| 3,674,504 | 7/1972 | Lane | 99/107 |
| 3,881,028 | 4/1975 | Capossella | 426/242 |
| 3,881,403 | 5/1975 | Ingram | 99/338 |
| 3,904,429 | 9/1975 | Eastman | 127/71 |
| 3,996,385 | 8/1976 | Vigerstrom | 426/244 |
| 3,997,678 | 12/1976 | Vigerstrom | 426/244 |
| 4,073,952 | 2/1978 | Standing | 426/242 |
| 4,246,293 | 1/1981 | Larson | 426/637 |
| 4,283,425 | 8/1981 | Yuan | 426/102 |
| 4,468,865 | 9/1984 | Inagaki | 34/1 |
| 4,492,839 | 1/1985 | Smith | 219/10.55 R |
| 4,547,376 | 10/1985 | Silver | 426/102 |
| 4,687,895 | 8/1987 | Chitre | 219/10.55 A |
| 4,749,579 | 6/1988 | Haydock | 426/242 |
| 4,756,916 | 7/1988 | Dreher | 426/302 |
| 4,778,681 | 10/1988 | Kuwahara | 426/241 |
| 4,780,586 | 10/1988 | LeViet | 219/10.55 A |
| 4,800,090 | 1/1989 | August | 426/243 |
| 4,816,274 | 3/1989 | Baisden | 426/417 |
| 4,906,483 | 3/1990 | Kloos | 426/243 |
| 4,917,909 | 4/1990 | Prosise | 426/102 |
| 4,919,965 | 4/1990 | Childers | 426/615 |
| 4,933,199 | 6/1990 | Neel | 426/438 |
| 5,049,711 | 9/1991 | August | 219/10.55 A |
| 5,180,601 | 1/1993 | Gaon | 426/242 |
| 5,194,277 | 3/1993 | Laufer | 426/243 |
| 5,292,540 | 3/1994 | Laufer | 426/242 |

Primary Examiner—George Yeung
Attorney, Agent, or Firm—Donald J. Lisa

[57] ABSTRACT

A continuous process for making fat-free potato chips without using any cooking oil whatsoever. Chipping potatoes are prepared, sliced, continuously monolayered onto a conveyer and squeegeed to remove the excess starch and moisture. The slices are initial cooked on independently controlled conveyers in a primary 3-zone oven where they are first radiant heated and then subjected to two stages of forced air convection heating by driving the air into both surfaces of the slices simultaneously as the moisture content is reduced to 15%. The slices are then final cooked in a dielectric heater where an even controlled heat is applied in two tandem drying zones where the potato slices are subjected to long wavelength (65.8 ft.) radio frequency (15 mhz) waves from two 20 kw transmitters which reduce the moisture content of the finished slices to 7%. The finished potato chips are seasoned and packaged and have the texture, appearance and mouthful of deep-fat fried potato chips.

21 Claims, 3 Drawing Sheets

METHOD OF MAKING FAT FREE POTATO CHIPS

FIELDS OF THE INVENTION

The present invention relates generally to a method and apparatus of cooking foodstuffs, and, more particularly, to making fat-free potato chips by radiant heating, forced air heating and radio frequency wave heating.

DISCUSSION OF BACKGROUND AND PRIOR ART a. Fats

Edible fats and oils ("fats") are organic compounds composed of three fatty acids attached to the glycerol molecule and are also known as triglycerides. Major types of fatty acids are saturated, polyunsaturated and monounsaturated.

The body needs a small amount of fats to carry fat soluble vitamins, to store energy, to cushion and protect vital organs, to insulate the body thermally, to give shape to the body and to regulate cellular metabolism. Non-essential fatty acids are made by the body itself, but essential fatty acids must be obtained dietetically through the foods we eat. But, fatty foods are high in calories (9 calories per gram of fat) and too much dietetic fat is bad for many reasons.

It is now well recognized and generally accepted, as demonstrated and proven by numerous scientific studies, that there is a close relationship between the amount of fat in one's diet and the risk of developing a life threatening disease. Fats saturated with hydrogen cause the body to produce more cholesterol which has been linked to coronary disease known as atherosclerosis (plague build-up on artery walls). Oil, composed mainly of polyunsaturated fats, in large quantities may increase the risk of cancer, and high fat diets generally have been scientifically linked to breast, colon, pancreas and prostate cancer. Importantly, fatty foods cause obesity. One reason is that it takes less energy (fewer calories) to convert fat to stored fat cells in the body than, other foods, such as, foods high in carbohydrates.

Fats and oils are now recommended by the U.S. government to be the smallest part of one's diet and are to be used sparingly. Most major health organizations now recommend that not more than thirty percent (30%) of the total calorie intake be from fat, and it has been scientifically established that keeping the dietetic percent calories from fat below ten percent (10%) on average, not only helps to avoid obesity, coronary disease and certain cancers, but also, can actually reverse atherosclerosis over a long time period. The Food and Drug Administration ("FDA") has now approved a new food label which will require listing the grams of fat and the calories from fat in the food.

One tablespoon of a vegetable oil contains 14 grams of fat, 126 calories and 100% of the calories are from the fat. Most common oils and fats are high in saturated fats and/or polyunsaturated fats.

Thus, it is now well recognized that one of the best choices of foods is a fat-free food. As defined by the FDA, fat-free means the food product must have less than 0.5 grams of fat per serving. It is an object of the present invention to produce fat-free food products.

b. Potato Chips

Potato chips are a favorite snack food for all age groups. Conventional potato chips are deep-fried in fat and are very high in calories. The typical finished potato chip contains 30–45% fat by weight and less than 5% moisture by weight (unless otherwise indicated by the context, all percentages of contents listed herein are by weight). A single one ounce (1 oz.) serving of any conventional potato chip contains about 10 grams of fat, 150 calories and 60% of the calories are from the fat. Not only is the deep-fried process difficult to control and inefficient, often resulting in overcooked chips, but also, the moisture and fat left in the product react together to shortly impart a rancid odor and flavor and loss of crispness which limits effective shelf life to about two weeks.

Because of the long term heavy emphasis on health and fitness and the strong trend toward greatly reducing the amount of fat in the food we eat, there has been a long felt need for a fat-free potato chip snack food product. It is an object of the present invention to produce fat-free snack food products, including potato chips.

c. Prior Low Fat Or Fat-free Potato Chip Processes And Products

Having recognized the long felt need, other inventors have attempted, without success, to produce a commercially acceptable fat-free potato chip that looks, feels and tastes like a conventional fatty potato chip cooked in fat.

(1). Prior Processes Extracting Lipids From Deep-fat Fried Potato Chips

The earliest and most obvious way to reduce the fat content of the finished potato chip product was to remove some of the oil absorbed by the food pieces during the deep-fat fried step. Various techniques included removing the pieces from the deep-fat frier while their moisture content was still relatively high (5–20%) and finishing heating by a variety of techniques, such as, hot air drying (including non-recirculated air), radiant heating, microwave heating or combinations thereof. These processes failed to produce a fat-free product.

(2). Prior Low Fat Processes

The next early attempts to reduce the fat content of the finished potato chip were by completely eliminating, nullifying or limiting the duration of any necessary deep-fat frying of the potato pieces. In a process to Yuan (U.S. Pat. No. 4,283,425) a single step of heating by microwave (910–915 mhz or 2400–2500 mhz) was used as the sole means to remove moisture and was alleged to produce a crispy, fat-free chip having the uniform color and taste of a deep fried potato chip. But, this product was not commercially successful, probably because the actual appearance and taste did not live up to its billing. Also, the non-standard equipment needed to make the product required significant investments. Moreover, optionally, the slices were dipped in or sprayed with an edible oil prior to final microwave cooking obviously to restore that characteristic desirable deep-fat fried taste. The added fat content of 3–5% by weight of this product equated to 0.85–1.43 grams per one ounce (28.5 gms.) serving, too high to be classified fat-free. Thus, this product was basically a "low-fat" potato chip.

In another process to Haydock (U.S. Pat. No. 4,749,579) standard potato chip making equipment was used, but the potato slices were first salted in depth, air dried and then preheated with infrared radiations before deep-fat frying. The finished "lite" potato chip product still had 26–32% fat by weight, whereas "regular" potato chips had 36–42% fat by weight. In another variation to Neel (U.S. Pat. No. 4,933,199), par-fried slices were de-oiled to less than 25% fat by passing superheated steam through them in a controlled oxygen environment followed by dehydrating to produce a finished potato chip having less than 2% moisture. In a still further variation of this process to Prosise (U.S. Patent) the slices were first coated with polyvinylpyrrolidone to provide increased resistance to oil absorption during the deep-fat frying step to produce a finished chip having 23% fat.

In still another process to Dreher (U.S. Pat. No. 4,756, 916), monolayered potato slices were sprayed with a partially hydrogenated cottonseed and soybean oil mixture, steam blanched, parabaked in a three zone oven at 425° F. (218° C.) to 15% moisture and final baked at 310° F. (155° C.) to 2% moisture producing a final potato chip having 10–18% fat by weight.

These products were not practical, fat-free and tasty.

(3). Prior Genuine Fat-Free processes ((a)). Infrared-Microwave-Infrared

Finally, it also has been known to produce potato chips genuinely without the use of any form of cooking oil whatsoever. In a continuous process to August (U.S. Pat. No. 4,800,090) sliced potatoes were first subjected to an infrared (high intensity 46 micron wavelength) heating step to warm their exterior, then to a microwave energy (915–2450 mhz) heating step to warm their interior, and finally to another infrared (4–6 micron wavelength) heating step to brown them into a crisp, fat-free, potato chip snack food product that was low in calories and had a long shelf life.

((b)). Microwave-Cold Water Rinse-Radiant Heat Batch

A further variation of a "no cooking oil" process was the batch process of Kloos (U.S. Pat. No. 4,906,483) in which the microwave cooking step was employed early in the process to activate the release of starch while the potato slices were still immersed in water followed by a cold water rinse and final cooking in radiant heat until brown and crisp to produce a fat-free potato chip.

((c)). Cooking Between Dual Relieved Opposed Surfaces

A still further fat-free process was to Childers (U.S. Pat. No. 4,919,965) which simultaneously final cooked the potato slices by compressing them between dual opposed heating surfaces which were 50% relieved driving the moisture into the voids in the cooking surfaces to produce a fat-free potato chip.

None of the genuine fat-free processes have been commercially successful. Either the texture or taste of the product has been unacceptable to consumers or the process was not continuous and therefor impractical in large quantities.

Thus, the market still cries out for an economically made, tasty, genuine, fat-free potato chip product.

It is an object of this invention to fill this long felt need by making a fully cooked fat-free potato chip product with a long shelf life that looks, feels and tastes like a conventional potato chip in an economical continuous process without using any cooking oil whatsoever.

SUMMARY OF THE INVENTION

Set forth below is a brief summary of the invention in order to achieve the forgoing and other benefits and advantages in accordance with the purposes of the present invention as embodied and broadly described herein.

One aspect of the invention is in a continuous process for making a cooked foodstuff without using any cooking oil including initial cooking moist food slices wherein the improvement includes final cooking the food slices in a dielectric heater by subjecting the slices to long wavelength radio frequency electromagnetic waves in an even controlled heating environment until the final moisture content is reached.

A further feature of this aspect of the invention is initially cooking the slices in a three zone primary oven by first radiant heating the slices and then subjecting the slices to two successive stages of forced air heating to reduce the moisture content of the slices to near a final moisture content.

Further features of this aspect of the invention include beginning with raw potato slices, independently controlling the time duration in each of the three zones, simultaneously forcing the air into the top and bottom surfaces of the slices in the primary oven to a near final moisture content of about 15% by weight, independently controlling the time duration of the slices in the dielectric heater to a final moisture content of about 7% by weight using wavelengths of about 65.8 feet at a frequency of about 15 mhz, and allowing the slices to successively, increasingly pile up in the last two forced air stages and the dielectric heating stage whereby a palatable, crisp, fat-free potato chip is produced having the texture and mouthfeel of a deep-fat fried potato chip.

Another aspect of the invention is forming the slices by reciprocating means holding the potatoes against a fixed cutting blade.

Other aspects of the invention include an apparatus for carrying out the process and the product made from the aforesaid process.

The present invention has the advantages of providing a fully cooked fat-free potato chip, that is low in calories, has a long shelf life and is made by a process that is easy to control and is economical to operate while producing potato chips in commercial quantities.

BRIEF DESCRIPTION OF THE DRAWINGS

FIGS. 1, 2A and 3 are front elevation views of the continuous process of the present invention shown partially in schematic form and partially in section along the lines 2A—2A of FIG. 2.

DETAILED DESCRIPTION OF THE PREFERRED EMBODIMENT

Figure 1:
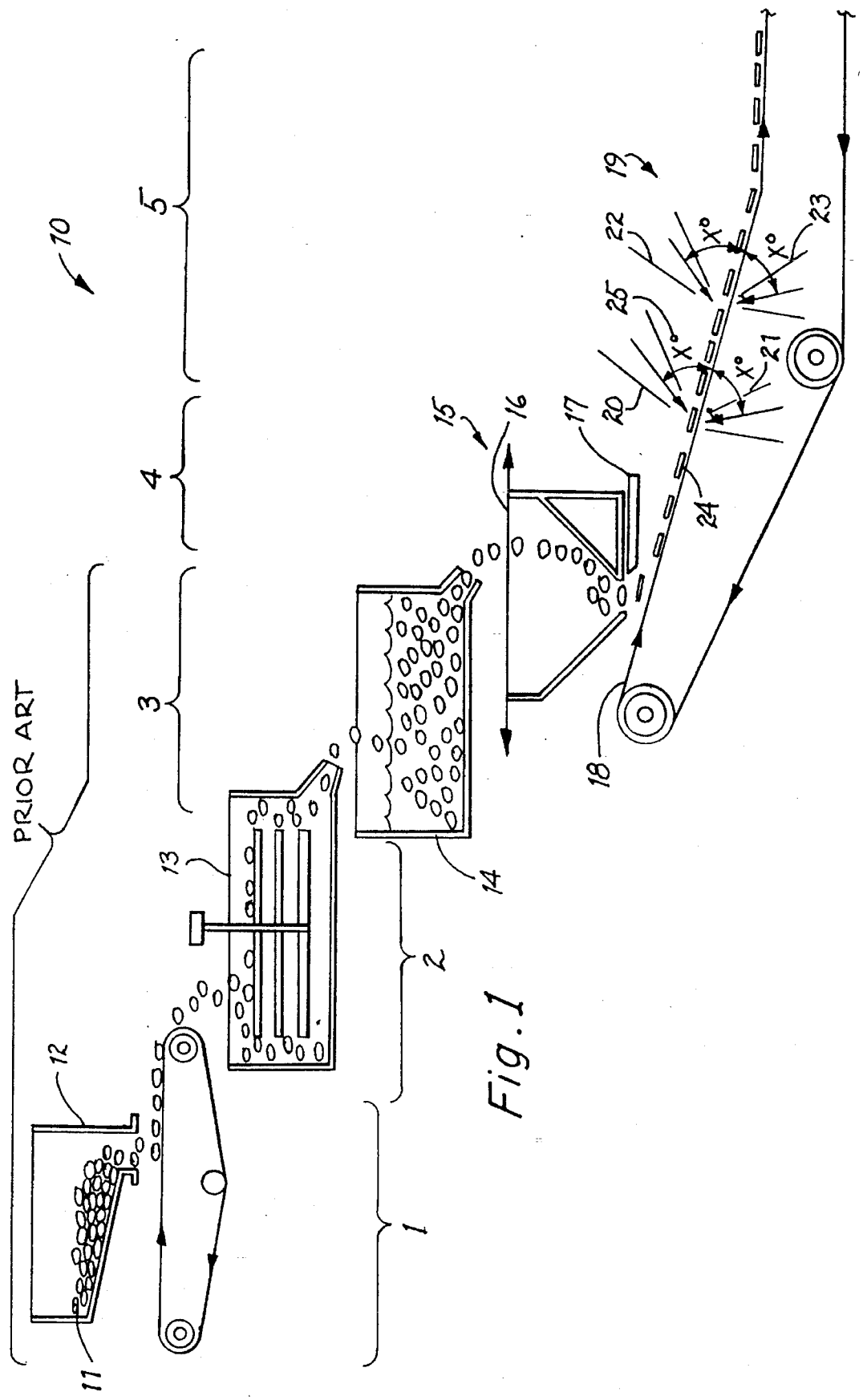
Figure 2:
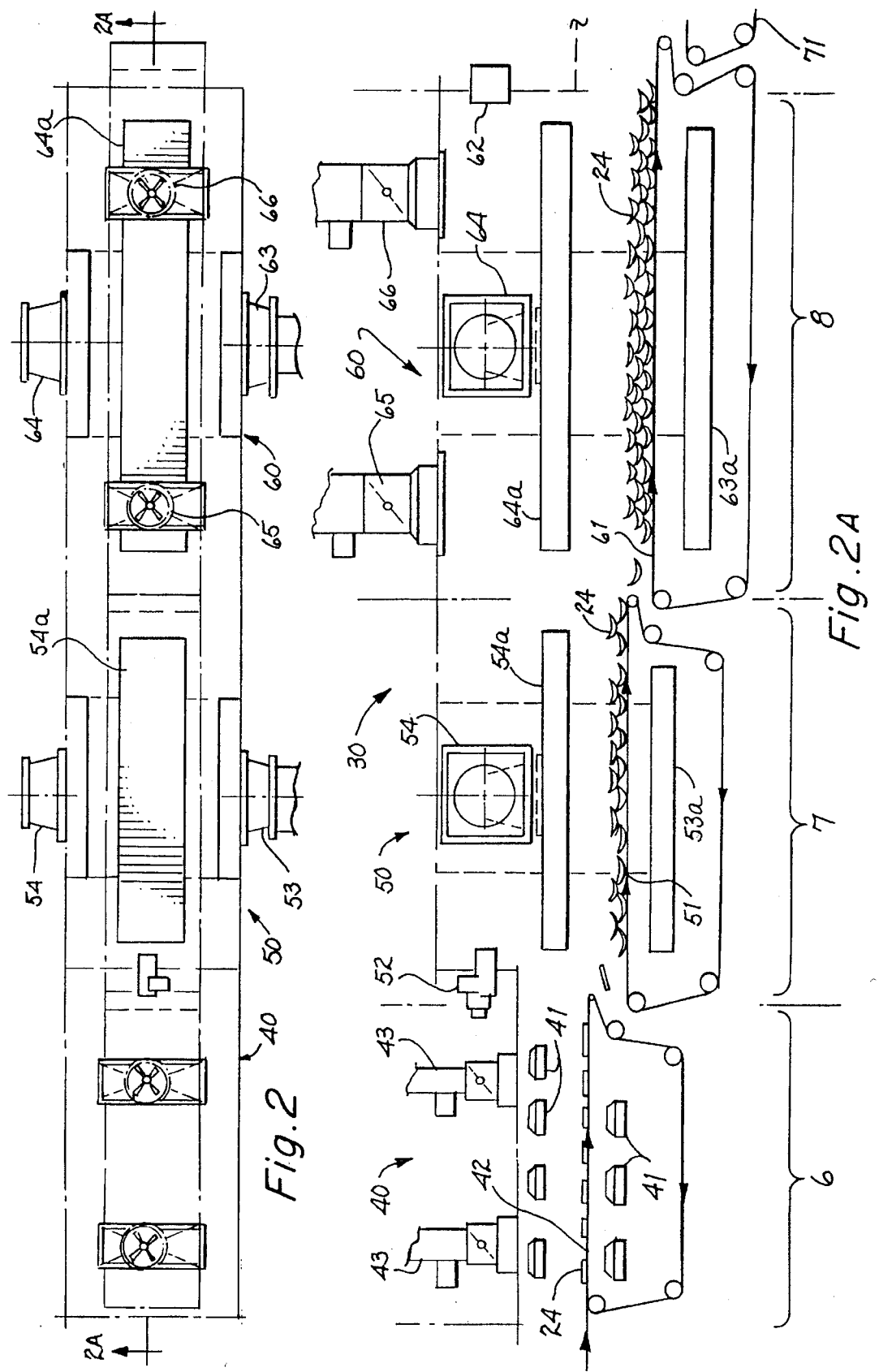
FIG. 2 is a top plan view of the three zone primary oven of the present invention.
Figure 3:
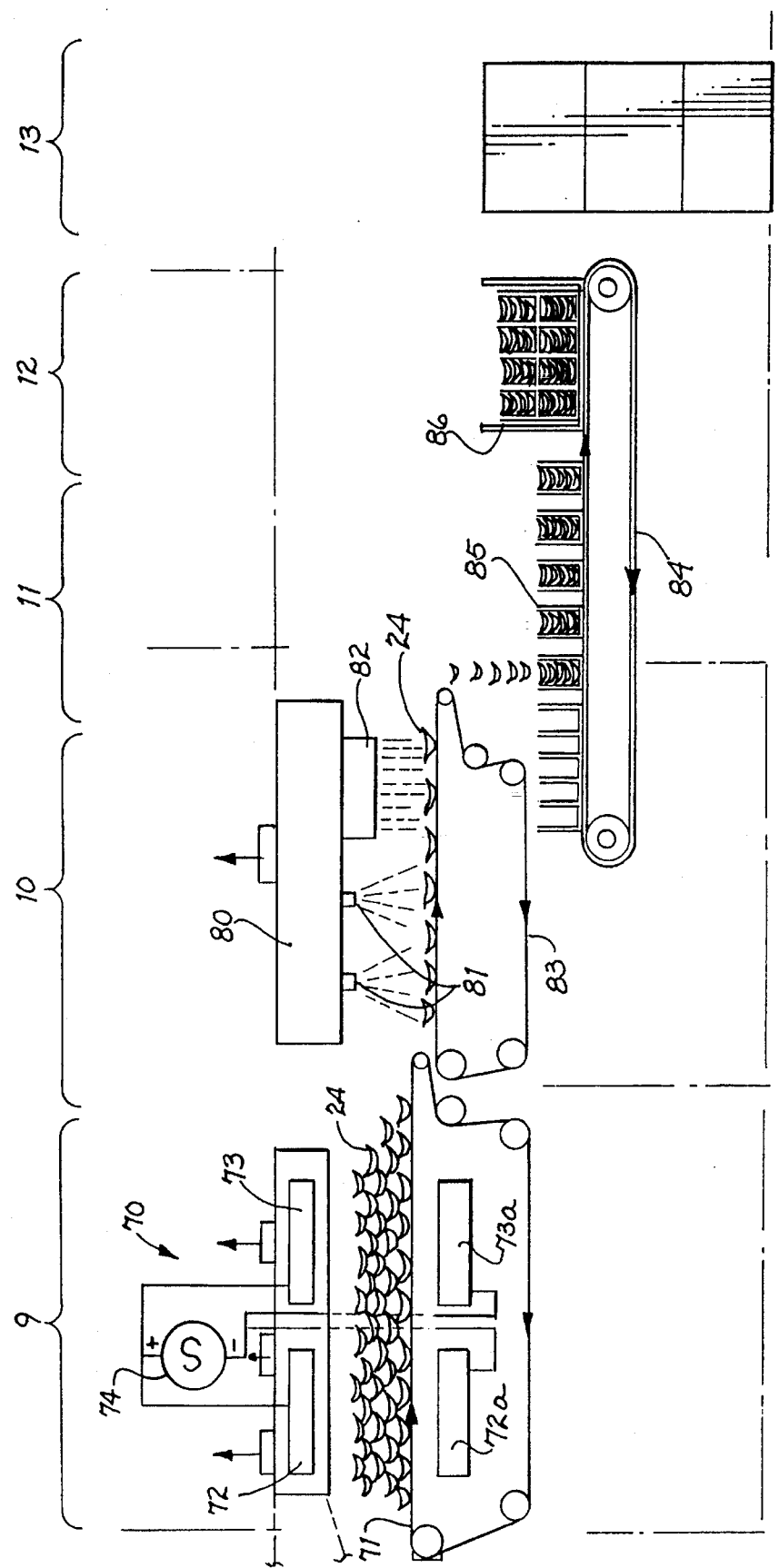

FIGS. 1–3 show the preferred form of an apparatus for carrying out the process 10 of the present invention. In accordance with the present invention it has been determined that a fat-free potato chip can be produced without deep-fat frying the potato pieces and yet still maintain a pleasant look, mouthfeel, texture and taste of the finished product. The improved process utilizes a three zone primary oven—having one radiant heat and two forced hot air stages for initial drying of the prepared monolayered potato slices to 7–15% moisture content— and then a dielectric long wavelength radio frequency oven for final drying of the chips to 7% moisture content. A step-by-step description of the process 10 and associated apparatus follows in which the numbers next to each heading below correspond to numbered stations shown in FIGS. 1–3.

1. THE POTATOES

As shown in FIG. 1, the preferred starting materials are conventional chipping potatoes 11, such as, Kennebec or Atlantic Chipping potatoes. Numerous other varieties will also work. Stones and other debris are removed from the potatoes in a conventional mechanical destoner 12.

2. SCRUBBER

As shown in FIG. 1, the scrubber 13 is a conventional rotating drum with counter rotating rollers along the outside which are covered with a light abrasive that cleans the skins of the potatoes without removing the skin. If it is desired to remove the skins, the same piece of equipment can be equipped with more abrasive rollers to accomplish this step. The scrubbed potatoes then pass to the washing step.

3. WASHER BIN

As shown in FIG. 1, the washer bin 14 is a vat of water that is used to rinse any remaining debris from the scrubbed potatoes.

4. THE SLICER

As shown in FIG. 1, the slicer is shown generally as 15 in FIG. 1 and slices the potatoes to a preferable uniform thickness of 0.7–0.95 millimeters depending upon specific market desires. Uniform thickness is important to maintaining even oven temperatures and thorough even cooking of each slice. The slicer 15 is a gravity fed, reciprocating bin 16 which cooperates with a stationary blade 17 to achieve a monolayering of the potato slices 24 on the moving conveyer belt 18. The belt speed is adjusted to achieve a preferential covering of about 85%–90% of the conveyer 18 with potato slices 24 ("product density"). The conveyer belt 18 is a 6 feet wide mesh screen sized to allow small chip pieces and slicing debris to fall through and be carried away by conventional means (not shown). The speed of the belt will vary with the quantity of throughput and the size of the potatoes and desired product density. Next, the monolayered slices 24 are spray washed.

5. SPRAYER WASHER

The inclined, sprayer washer shown generally as 19 in FIG. 1 is a high pressured stream of water spraying the chips from equal angles 25 above and below the conveyer belt creating a squeegee action to remove excess starch and moisture. Preferably spray washer 19 has multiple pairs of spray streams 20–23. The angles 25 and force of the streams 20–23 are selected to achieve effective squeegee action without disturbing the monolayering and product density of the slices 24. The incline of conveyer belt 18 further assists in the removal of the liquids and starch. The potato slices 24 are now ready for cooking.

Although the invention is preferably practiced using raw potatoes which are washed, peeled, sliced, monolayered and spray washed to destarch them, other embodiments are possible. For example, peeling may be omitted, moving blade slicers may be used and other conventional destarching methods are known.

6–8. THE PRIMARY OVEN

As shown in FIG. 2A, the primary oven 30 is a three zone cooking processor which includes a radiant oven 40 followed by two forced air convection ovens 50, 60. The temperatures, air velocity and belt speeds are independently controllable in each phase to allow for maximum adaptability in accommodating the requirements of different varieties and throughputs of potatoes 11.

The following specifications are for an apparatus which has the output capacity at the end of the dielectric heating step 70 to continuously produce about 1000 lb./hr of finished potato product output. The total input capacity of the primary oven 30 necessary to continuously provide the aforesaid output varies with the variation in the moisture content of the input potatoes 11. At 80% moisture of the potato slices 24, the input capacity of primary oven 30 is about 4547.8 lbs./hr. in order to provide a final output after the dialectic heater of about 1004.9 lbs./hr. The passage from the primary oven 30 to the dielectric heater 70 is enclosed to reduce the amount of lost heat during the transition between ovens.

6. THE RADIANT ZONE

As shown in FIG. 2A, monolayered slices 24 enter the input end of radiant zone 40 by dropping onto belt 42, which is 6 feet wide, without disturbing the monolayering. The radiant oven 40 heats the chips from both the top and the bottom by radiant, gas, high intensity, ceramic heaters 41 operating at approximately 1600° F. The length of this zone is about 15 ft. The speed of the belt is about 30 ft. per minute. The duration of slices 24 in this zone 40 is about 30 seconds at a product density of about 90% and a monolayered product depth of about 0.29 inches. This step brings the right amount of glucose to the surface of the chips 24. Too little glucose will cause the chips 24 to dry out in the next steps creating a powder on the surface, a scaly appearance, reduced chip snap, tough texture and an unpalatable taste. Too much glucose removal will cause the chips 24 to have an extreme glazed appearance. The chips 24 next pass to the first forced air zone 50.

7. THE FIRST FORCED AIR PHASE

As shown in the embodiment of FIG. 2A, the monolayered chips 24 enter the first forced air zone 50 by dropping onto belt 51 which is 6 feet wide. Zone 50 is heated by gas burners 52, 62.

In zone 50 the use of forced air is considered very important to the drying time of the potato chips 24. The forced air actually is driven into the chips 24 to remove moisture at a rate which would take significantly longer in a solely convection or other standard oven. Fans 53, 54 are shown mounted to the sides of the belt 51 in FIG. 2 but actually blow air into ducts 54a and 53a straddling the belt 51 and which exit directly onto the top and bottom, respectively, of the belt 51. In zone 50 hot dry, recirculated air is thus blown directly into the top and bottom surfaces of the chips 24 by zone 50 dry air recirculation fans 53, 54. The hot air from fans 53, 54 is simultaneously driven into the top and bottom surface of the chips 24. The outer layers of the chips 24 are also dried so that they do not stick together in the subsequent zones of the ovens 30, 70. The air is heated to a temperature of about 410° F. with about 4200 cubic ft./min. of air directed toward the top surface of the chips 24 and 6000 cubic ft./min. toward the bottom surface of the chips 24. The removed moisture is vented to exhaust through the top exhaust fans 65, 66 of the oven 30. A balance between exhaust and recirculation is achieved by trial and error based on observation and test of the throughput product. The length of zone 50 is about 16 ft. The belt 52 speed is about 20 ft./min. The zone duration is about 48 seconds. The product density is about 135%. Because belt 52 is moving slower than belt 42, the product depth will vary during this phase due to the curling and pile-up effects of the chips 24. The slices 24 then pass to the third zone 60 of oven 30.

While fans 53, 54 are shown as side mounted with the exhaust fans 65, 66 at the top, other configurations are possible in both forced air zones 50, 60.

8. THE SECOND FORCED AIR PHASE

As shown in FIG. 2A the slices 24 enter the third zone 60 of the primary oven 30 by dropping onto belt 61 which is 6 feet wide. Zone 60 is heated by gas burners 52, 62. Zone 60 continues to dry the potato chips to near final moisture content by forcing dry hot air into the top surfaces and bottom surfaces of the chips 24 using side mounted recirculating fans 63, 64 shown in FIG. 2 which blow into bottom duct 63a and top duct 64a in the same manner as was done in zone 50. The air is heated to a temperature of about 350° F. with about 4200 cubic ft./min. of air directed at the top surfaces and about 6000 cubic ft/min at the bottom surfaces of the chips. The moisture is vented through the top of the oven by exhaust fans 65, 66 with balance achieved between exhaust and recirculation as was done in zone 50. The length of this zone is longer, i.e., about 29 ft. The belt 61 speed is about 5.8 ft./min. The phase duration is about 5 minutes (300 seconds). The product density is about 465%. Again, because belt 61 is moving slower than belt 51, the slices continue to pile up and overlap, and the product depth grows to approximately 3.5 inches. This final phase of the primary oven 30 dries the potato chips 24 to approximately 15% moisture content. The chips 24 then pass to the final cooking stage in dielectric oven 70.

Although it is possible to dry the chips in zone 60 to the final desired moisture content target of approximately 7%, it creates an unacceptable "sawdust taste". More than 15% moisture content will put additional strains on the production capacities of the dielectric heater 70 in the next step.

9. DIELECTRIC HEATER (TANDEM UNIT)

As shown in FIG. 3, the chips 24 enter the dielectric oven or drier 70 by dropping onto belt 71 which is about 6 feet wide. The dielectric oven 70 uses long wavelength, radio frequency, electro-magnetic waves of about sixty-six (66) feet wavelength to create a controlled even heat which heats the chips 24 from deep inside the product in order to remove the remaining moisture to the desired 7% final moisture level.

Most dielectric heating is done at radio frequencies of 10–100 MHz. The preferred operating frequency range of the dielectric oven of the present invention is about 10–20 mhz which is in the high frequency range. A preferred frequency of about 15 mhz would have a wavelength of 20 meters or about 65.8 feet $(=(300\times10^6$ m/sec$\div15$ mhz$)\times 3.29^{ft}$m). Conventional microwave technology, such as is used in common home microwaves, uses a wavelength of 1.00 feet to 0.40 feet for operating frequencies of 915–2450 mhz, respectively, and creates an uneven poorly controlled heat which is unacceptable for the final heating stage of the continuous process of the present invention.

These long waves of the present invention can remove the highest level of moisture content of the chips reaching oven 70 and thereby even out any variances in moisture content in the chips 24 in the dielectric oven 70. The dielectric oven 70 uses two tandem mounted 20 kilowatt parallel plate (electrodes) high frequency fields schematically shown in FIG. 3 as generator 74 and parallel electrode pairs 72–72a and, 73–73a, one following the other. The belt 71 speed is variable and is selected so that the depth of the potato slices is allowed to pile up until it is approximately 7 inches, about double the depth of the product 24 in the second forced air zone 60 of primary oven 30. This bed depth in oven 70 optimize the moisture removal capability of dielectric heater 70. The time duration of the product in dielectric heater 70 is also variable depending upon the desired moisture content of the chips 24 incoming to heater 70.

10. THE SEASONING UNIT

AS shown in FIG. 3, the seasoning unit 80 is barrel shaped with two distinct phases of operation. The first stage has sprayers 81 which add "Tack" for adhering the dry seasonings added in the second stage. The tack may be maltodextrin, gum arabic, edible oil (up to the FDA regulated limit for fat-free) or other similar substances. Liquid flavor extracts and brine salt may be added at this phase. Fat-free substitutes simulating fat mouthfeel, if available, may be added. The second phase has an auger 82 which applies dry seasoning to the potato chips including salt and other seasonings such as Bar-B-Que, Sour Cream Onion and the like. Depending on plant layout and temperate zone in which it is located, a heat tunnel may be required to dry or cure the seasoning mix to the chips 24.

Belt 83 may be operated at any convenient speed to accommodate the throughput of the line and bag and carton the finished chips 24.

11. FORM AND FILL

As shown in FIG. 3, a conventional machine (not shown) folds and molds plastic film into bags 85 which are placed on conveyer belt 84. The conveyer 83 drops measured amounts of the finished chips 24 into the plastic bags 85. The machine (not shown) seals the plastic bags 85.

12. CASE PACKING

As shown in FIG. 3, once the chips 24 are bagged they are placed into boxes 86. These boxes are then moved to the warehousing area.

13. WAREHOUSE

As shown in FIG. 3, the finished chips 24 are produced in accordance with anticipated orders. However since the chips have no oil and a low moisture content, they do not readily become rancid or lose their crispness. Chips 24 have a storage/shelf life of 6 months or more.

The process 10 has been described with respect to making a potato chip snack food product 24. However, with minor adjustments the process is equally capable of making other snack foods, including taco/tortilla chips, formed potato chips, potato sticks, puffs and crisps, non-potato chips and puffs and similar snack food products.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In a continuous process for making a cooked foodstuff without using any cooking oil including initial cooking moist food slices wherein the improvement comprises:

final cooking the food slices in a dielectric heater by subjecting the slices to long wavelength radio frequency electromagnetic waves having a predetermined wavelength sufficient to create an even controlled heating environment to heat the food slices until a predetermined final moisture content is reached.

2. The process of claim 1 wherein the initial cooking step further comprises the step of:

initially cooking the slices in a three zone primary oven by first radiant heating the slices and then subjecting the slices to two successive stages of forced air heating to reduce the moisture content of the slices to near a final moisture content.

3. The process of claim 2 wherein the forced air heating steps further comprise the step of:

simultaneously forcing air into the top and bottom surfaces of the slices.

4. The process of claim 3 wherein the slices are fat-free potato slices and the near final moisture content being in the range of about 7–15% by weight whereby a palatable, crisp, fat-free potato chip is produced having the texture and mouthfeel of a deep-fat fried potato chip.

5. The process of claim 4 wherein the slices have top and bottom surfaces further comprising the step of:

forcing the air against the upper surfaces of the slices at a speed of about 4200 feet per minute and against the bottom surfaces of the slices at a speed of about 6000 fpm.

6. The process of claim 5 further comprising the step of:

independently controlling the time duration of the slices in each of the three zones.

7. The process of claim 6 wherein the final moisture content of the slices being about 7% by weight.

8. The process of claim 2 further comprising the step of:

allowing the slices to successively, increasingly pile up in the forced air heating stages.

9. The process of claim 1 further comprising the step of:

initially cooking the slices by radiant and convection heating of the slices and simultaneously forcing air into the top and bottom surfaces of the slices.

10. The process of claim 1 wherein the slices are potato slices and further comprising the step of:

initially cooking the slices to a near final moisture content being in the range of about 7–15% by weight.

11. The process of claim 1 further comprising the steps of:

initially cooking the slices in a three zone primary oven, and independently controlling the time duration of the slices in each of the three zones.

12. The process of claim 11 further comprising the steps of:

controlling the time duration in the first zone to about 30 seconds, in the second zone to about 48 seconds and in the third zone to about 5 minutes.

13. The process of claim 1 further comprising the step of:

independently controlling the time duration of the slices in the dielectric heater to obtain a final moisture content of about 7% by weight.

14. The process of claim 13 wherein the slices are potato slices and further comprising the step of:

initially cooking the slices to a near final moisture content being in the range of about 7–15% by weight whereby a palatable, crisp, fat-free potato chip is produced having the texture and mouthfeel of a deep-fat fried potato chip.

15. The process of claim 1 further comprising the step of:

piling up the slices in the final cooking step to about double the depth of the slices in the initial cooking step.

16. The process of claim 1 wherein the frequency of the waves is in the high frequency range.

17. The process of claim 16 wherein the frequency of the waves is in the range of about 10–100 MHz.

18. The process of claim 17 wherein the operating frequency is about 15 MHz and the wavelength is about sixty-six (66) feet.

19. The process of claim 1 further comprising the step of:

performing the final cooking step by two tandomly mounted high frequency fields.

20. The process of claim 19 wherein each of the two fields is about 20 kw output power.

21. The process of claim 1 wherein the foodstuff is potatoes further comprising the step of:

forming the slices by reciprocating means holding the potatoes against a fixed cutting blade.

* * * * *